US011861430B2

(12) United States Patent
Braumandl et al.

(10) Patent No.: US 11,861,430 B2
(45) Date of Patent: Jan. 2, 2024

(54) PRODUCT-MARKING SYSTEM AND METHOD FOR MARKING A PRODUCT

(71) Applicant: Sensor-Instruments Entwicklungs- und Vertriebs-GmbH, Thurmansbang (DE)

(72) Inventors: Walter Braumandl, Thurmansbang (DE); Alexander Baumann, Felixdorf (AT); Helmut Löw, Ingolstadt (DE)

(73) Assignee: SENSOR-INSTRUMENTS ENTWICKLUNGS- UND VERTRIEBS-GMBH, Thurmansbang (DE)

( * ) Notice: Subject to any disclaimer, the term of this patent is extended or adjusted under 35 U.S.C. 154(b) by 318 days.

(21) Appl. No.: 17/069,010

(22) Filed: Oct. 13, 2020

(65) Prior Publication Data

US 2021/0117632 A1 Apr. 22, 2021

(30) Foreign Application Priority Data

Oct. 16, 2019 (DE) ..................... 10 2019 127 894.5

(51) Int. Cl.
*G06K 1/12* (2006.01)
*G06K 7/12* (2006.01)
(Continued)

(52) U.S. Cl.
CPC ............. *G06K 1/121* (2013.01); *B41M 3/006* (2013.01); *B41M 3/144* (2013.01); *G06K 1/00* (2013.01); *G06K 7/12* (2013.01)

(58) Field of Classification Search
CPC ............ G06K 1/121; G06K 1/00; G06K 7/12; B41M 3/006; B41M 3/144
See application file for complete search history.

(56) References Cited

U.S. PATENT DOCUMENTS 5,279,058 A * 1/1994 Kohn ........................ G09F 3/02
10,107,800 B2 * 10/2018 Dixon ...................... C07K 7/08
(Continued)

FOREIGN PATENT DOCUMENTS

| DE | 102004016249 A1 | 10/2005 |
| EP | 2494528 B1 | 2/2019 |
| WO | 2018/197635 A1 | 11/2018 |

OTHER PUBLICATIONS

Unpublished U.S. Appl. No. 16/608,619.

*Primary Examiner* — Thien M Le
*Assistant Examiner* — Asifa Habib
(74) *Attorney, Agent, or Firm* — J-TEK LAW PLLC; Jeffrey D. Tekanic; Scott T. Wakeman

(57) ABSTRACT

A system (100) and a method for marking a product (10) utilize an encoding that specifies the presence or absence of each of a plurality of luminescent materials, at least one of which exhibits a predetermined decay behavior. The decay behavior of a plurality of different materials is detected, and based thereon the presence or absence of the luminescent materials is inferred. A corresponding encoding specifies whether or not the respective materials are present. In this way, different encodings can be associated in advance with different properties of the product (10). The luminescent materials that specify the associated encoding can be applied to the product (10) as a mark (20) in accordance with a determined property of the product (10).

22 Claims, 4 Drawing Sheets

(51) Int. Cl.
*B41M 3/14* (2006.01)
*B41M 3/00* (2006.01)
*G06K 1/00* (2006.01)

(56) References Cited

U.S. PATENT DOCUMENTS

| | | | |
|---|---|---|---|
| 2004/0220298 A1* | 11/2004 | Kozee | B41M 3/144 106/31.86 |
| 2006/0180792 A1* | 8/2006 | Ricci | G07C 9/20 252/301.36 |
| 2013/0020504 A1 | 1/2013 | Kraemer et al. | |
| 2014/0191036 A1* | 7/2014 | Manion | G06K 19/0614 235/494 |
| 2016/0258881 A1 | 9/2016 | Bown et al. | |
| 2016/0314374 A1 | 10/2016 | Braumandl | |
| 2021/0049852 A1 | 2/2021 | Braumandl et al. | |
| 2022/0236282 A1* | 7/2022 | Mallick | G01N 33/543 |

* cited by examiner

FIG 5

| | UV/VIS | | UV/VIS | | BLUE/IR | | RED/IR | | IR/IR |
|---|---|---|---|---|---|---|---|---|---|
| 1 | UV/BLUE e.g., 150μs | 1 | UV/BLUE | → BLUE | 1 | BLUE/IR (Marker 1) e.g., 150μs | 1 | RED/IR e.g., 300μs | 1 | IR/IR (Marker 1) 130μs |
| 2 | UV/GREEN e.g., 300μs | 2 | UV/GREEN | → GREEN | 2 | BLUE/IR (Marker 2) e.g., 400μs | 2 | Not Used | 2 | IR/IR (Marker 2) 250μs |
| 3 | UV/RED e.g., 500μs | 3 | UV/RED | → RED | 3 | BLUE/IR + BLUE/IR (Marker 1+2) e.g., 275μs | | | 3 | IR/IR (Marker 3) 500μs |
| 4 | UV/GREEN + UV/RED e.g., 400μs | 4 | UV/GREEN + UV/RED | → YELLOW | 4 | Not Used | | | 4 | IR/IR + IR/IR (Marker 1+2) 190μs |
| 5 | UV/BLUE + UV/GREEN e.g., 225μs | 5 | UV/BLUE + UV/RED | → MAGENTA | | | | | 5 | IR/IR + IR/IR (Marker 2+3) 375μs |
| 6 | Not Used | 6 | Not Used | | | | | | 6 | Not Used |

PRODUCT-MARKING SYSTEM AND METHOD FOR MARKING A PRODUCT

CROSS-REFERENCE

The present application claims priority to German patent application serial number 10 2019 127 894.5 filed on Oct. 16, 2019, the contents of which are incorporated fully herein by reference.

TECHNICAL FIELD

The present teachings generally relate, in one aspect, to a product-marking system, which may be used for the automated marking of a product by using (e.g., by applying) a machine-readable encoding, as well as an associated method therefor. In addition, the present teachings generally relate, in another aspect, to a product-identification system for identifying a product that is provided with such a machine-readable encoding, as well as to a plastic material for use in a product that has such a machine-readable encoding. For example, the plastic material may be suitable for use in a plastic packaging, e.g., for beverages.

BACKGROUND ART

US 2016/0258881 A1 discloses techniques for tracking materials by using luminescent marks. The marks are formed from a plurality of luminescent materials. An encoding (machine-readable luminescent marker) for identifying the processed material can be generated by using the plurality of luminescent materials. To read out the encoding (luminescent marker), multiple excitation wavelengths are emitted in succession and the spectra obtained in response thereto are evaluated. In particular, a search for the presence of different emission wavelengths of the luminescent materials is performed. Depending on whether an emission wavelength is present or not, a bit of a binary code is set to zero or one.

SUMMARY OF THE INVENTION

It is an one non-limiting object of the present invention to disclose techniques for marking products with luminescent materials (e.g., taggants) to provide one or more machine-readable encodings (luminescent marker(s)) as well as techniques for reading such encodings (luminescent marker(s)).

In one aspect of the present teachings, an automated product-marking system is disclosed that facilitates the marking of a product with an encoding (luminescent marker(s)) that is associated with a property of the product, wherein in an optional later step the encoding can be read out in a highly reliable and efficient manner.

In another aspect of the present teachings, methods and materials that facilitate the automated marking and the reliable and efficient reading-out of the encoding (luminescent marker(s)) are also disclosed.

In another aspect of the present teachings, a plastic material is disclosed for use in a product, such as packaging. The plastic material includes or contains a plurality of luminescent materials in synthetic polymer. At least one of the luminescent materials exhibits a predetermined decay behavior. The presence or absence of each of the plurality of materials determines an encoding that is associable with a property of the product. The plastic material may be incorporated, e.g., in plastic packaging, such as, e.g., plastic beverage bottles.

A product-marking system according to the present teachings may include, for example, a product-identification device that includes a camera and/or a color detection sensor configured for detecting at least one property of a product to be identified. Such a product-identification device may be used in connection with an encoding device that is configured for determining an encoding to be associated with the property. In this case, it is possible to apply an appropriate encoding (luminescent marker(s)) onto a product to be processed in an automated manner. In such an embodiment of the present teachings, the product-identification device is preferably configured to detect more than one property of the product to be marked. In this case, more than one encoding optionally can be applied to the product in an automated manner.

In another aspect of the present teachings, different markers (i.e. luminescent materials) that luminesce, i.e. exhibit luminescence, and that preferably have different decay behaviors (e.g., decay times) may be used in combination to form an encoding that can be applied in a reliable manner, in particular when the respective markers do not influence one another. Furthermore, if the different markers are excited by the same excitation wavelength but exhibit different decay behaviors, then the subsequent evaluation (detection, analysis) of the encoding (luminescent marker(s)) can be simplified because the presence or absence of two or more markers can be checked by using a single excitation pulse.

In the past, known luminesce detectors have relied exclusively on the presence of different emission wavelengths in a recorded spectrum. However, in methods and devices according to one aspect of the present teachings, the decay behavior (decay time(s)) of one or more luminescent materials is used to evaluate (read) the encoding (luminescent marker(s)), thereby making possible a more reliable and more precise determination of the encoding. The evaluation (reading) of the encoding is preferably effected in an intensity-independent manner, since only the time constant of the decay behavior is determined, or the color can be evaluated separately from the intensity. Furthermore, such embodiments of the present teachings make possible a significantly faster data-collection. In addition, multiple values can be determined at the same time by using one excitation pulse. For example, the decay behavior of phosphorescent markers, which possibly may be present, and the intensity of a non-phosphorescent marker (e.g., a fluorescent marker), which possibly may be present, can be determined by emitting one UV pulse in such embodiments.

Thus, some techniques according to the present teachings are based on the recognition that it is possible to use a set of different markers having differing characteristic decay behavior in different excitation- and emission-wavelength ranges. In this regard, markers are known that exhibit luminescence having a certain decay behavior and can be excited, for example, in the UV range, in the blue range, in the red range, or in the IR range. By utilizing such markers in combination, it increases the number of possible encodings that can be reliably detected. In addition thereto, multiple markers exhibiting fluorescence (i.e. fluorescent markers), whose color can also be detected, also can be used in embodiments of the present teachings to add further elements (detectable emission wavelengths) to the encoding (luminescent markers).

In another aspect of the present teachings, luminescent materials may be introduced (e.g., embedded) into a plastic material, for example, by using a so-called masterbatch that contains luminescent materials embedded in a plastic matrix, during manufacturing to mark products that are comprised at least partially of the plastic material. Thus, for example, a multi-layer construction can be used in plastic bottles wherein at least one of the plastic layers contains the plastic material having the mark (luminescent materials). By detecting the mark (one or more luminescent materials) embedded in the plastic material, for example, during a recycling process, different plastics can be easily identified and separated (sorted) based on the detected marks.

Additional objects, embodiments, features, utilities and advantages of the present teachings will become apparent from the following description of detailed embodiments and from the claims with reference to the figures.

BRIEF DESCRIPTION OF THE DRAWINGS

FIG. 5 contains a table that shows different luminescent markers that are usable in connection with various aspects of the present teachings.

DETAILED DESCRIPTION OF THE EMBODIMENTS OF THE INVENTION

In the following, exemplary embodiments of a product-marking system and of a product-identification system of the present teachings as well as associated methods are described with reference to the Figures. In addition, exemplary applications of luminescent markers (encodings) according to the present teachings are also described.

Figure 1:
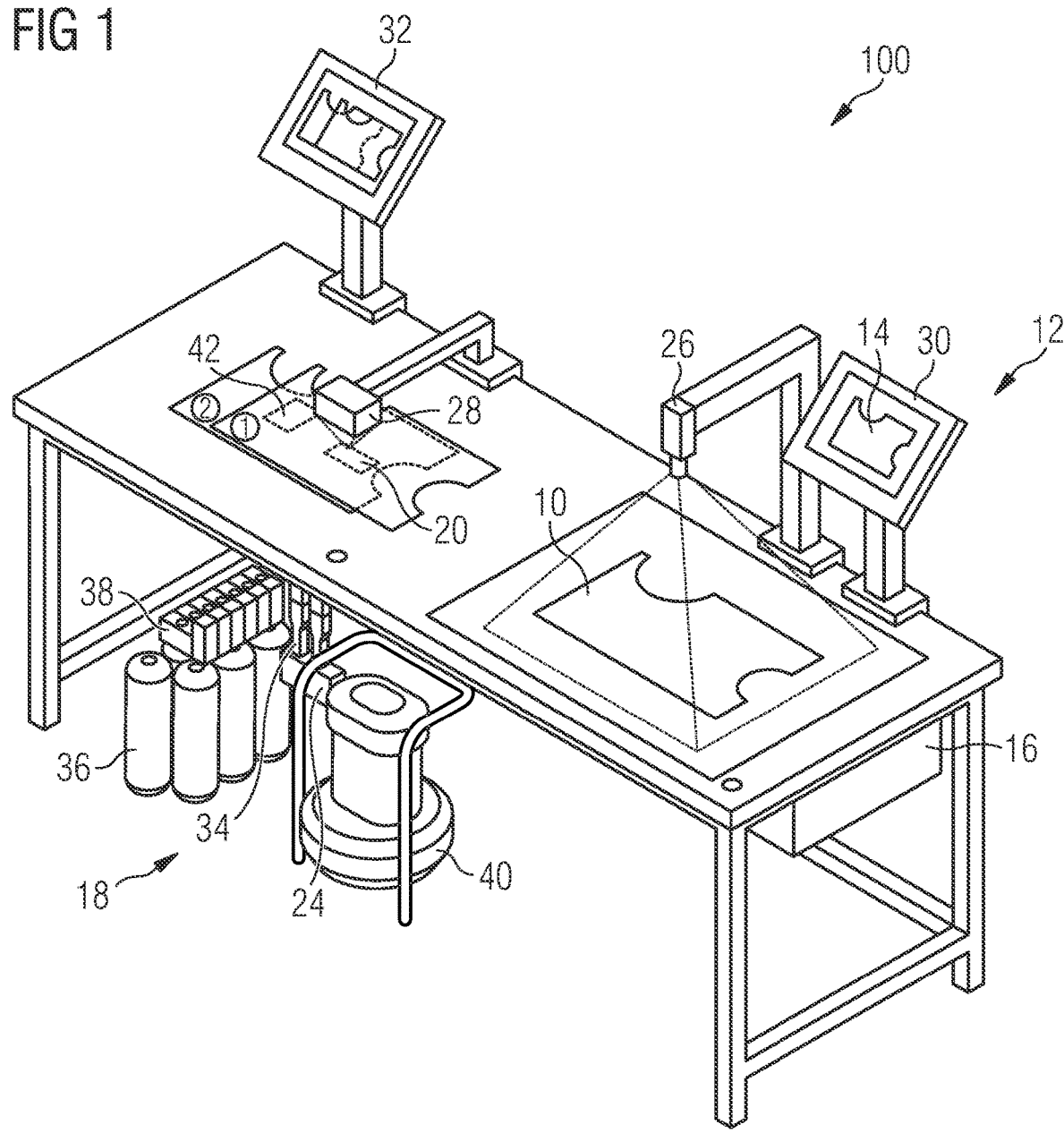
FIG. 1 shows a perspective view of a representative embodiment of a product-marking system according to the present teachings.

FIG. 1 shows a perspective view of a representative, non-limiting product-marking system 100 for marking a product 10 according to a first embodiment of the present teachings.

As shown in FIG. 1, the product-marking system 100 includes a product-identification device 12 configured to detect (identify, recognize, deduce) at least one physical property of the product to be marked. An encoding device 16 is configured to determine (select) an encoding (which contains one or more luminescent markers), e.g., from a plurality of encodings (each containing one or more luminescent markers), associated with (based on, corresponding to) the detected physical property. Preferably, the (each) encoding specifies (is based upon) the (unique) presence or absence of a plurality of luminescent materials (i.e. materials that exhibit luminescence, preferably photoluminescence, such as fluorescence and/or phosphorescence), and at least one of the luminescent materials exhibits a predetermined decay behavior. A mark-applying unit 18 is configured to selectively apply one or more (preferably two, three or more) of the plurality of luminescent materials onto the product 10 for forming the determined (selected) encoding. A control unit 24 is configured to control the mark-applying unit 18 such that it applies a mark 20, which corresponds to the determined (selected) encoding, onto the product 10. The individual components of the product-marking system 100 as well as the encoding are described in more detail below.

In the present embodiment, the product-marking system 100 is used to mark an industrially processed workpiece, such as a leather cutting, as is used, for example, in the automotive industry. That is, as used herein, the term "product" is intended to comprise not only end products of a manufacturing process, but also starting products and intermediate products, such as to-be processed workpieces or the like. The exemplary leather cuttings can have different shapes and colors that must be reliably detected in an automated manner in the course of a later processing. In order to make this reliable detection possible, the product-marking system 100 of the present embodiment applies a corresponding machine-readable mark (encoding) 20 onto the product 10. For example, in the case of leather cuttings, the mark is preferably applied onto the rear side of the product 10 (i.e. the side that is not exposed when in its final installed state). Furthermore, in some applications of the present teachings, it may be preferable to apply two or more separate (spaced apart) marks to make possible the detection of multiple different properties of the product, such as size, shape, color, thickness, etc. In the present embodiment, a first mark (encoding) is preferably used to indicate the shape of the product 10 (e.g., the leather cutting), and a second mark (encoding) is used to indicate the color of the product 10.

In the present embodiment, the properties of the product 10 may be detected in an automated manner. For example, the product-identification device 12 may be configured as an optical product-identification device that includes at least one camera 26 and/or a color detection sensor 28. Using the camera 26, the shape of the product 10 is determined using known image recognition methods. For monitoring purposes, an image 14 of the detected product 10 can be displayed on a display device 30. The shape of the product 10 is preferably detected in a first step of a processing process of the product 10. After successful detection of the shape of the product 10, the product 10 is advanced in the course of the process to another workstation where color detection is performed using the color detection sensor 28 (for example, using a known COAST-type color sensor sold by the present applicant). At this time as well, the shape and/or the color of the product 10 can be displayed on a further display 32 for monitoring purposes.

Based on the detected shape and/or the detected color of the product 10, the encoding device 16, which can be configured, for example, as a conventional computer having a processor, storage, etc., can determine (identify, select) the encoding (luminescent marker(s)) to be associated with the shape and/or the color. In the present embodiment, for example, all possible shapes of the product 10 are respectively associated with unique encodings (which may be expressed, for example, using a binary code or the like) in a database, which optionally may be stored, e.g., in the storage of the computer or in a separate server. Similarly, all possible colors of the product 10 are respectively associated with unique encodings. It is understood that in the case of a use of only a single mark that specifies multiple properties (e.g., shape and color), all possible combinations of shape and color can be respectively associated with unique encodings. In addition, in other embodiments of the present teachings, it is also possible that the encodings are not stored in a database in advance, but rather are generated in real time based on the detected property or properties of the product 10 using appropriate algorithms. In such embodiments, a corresponding algorithm for converting the detected encoding into the corresponding property (properties) of the product 10 must then be used to later identify the detected encoding and determine the properties specified thereby.

In a subsequent step of the process for marking the product 10, the control unit 24 controls the operation of the mark-application unit 18 such that at least one mark 20 that corresponds to the determined (selected) encoding is applied onto the product 10. In FIG. 1, although the control unit 24 is shown as a separate control unit, it is understood that the control unit 24 can be integrated with the encoding device 16 and it also includes a processor, storage, etc.

The mark-application unit 18 of the present embodiment includes a spray nozzle 34 in fluid communication with a plurality of containers 36. The containers 36 respectively contain the plurality of luminescent materials and are respectively connected to the spray nozzle 34 via solenoid valves 38. The control unit 24 is configured to control the respective solenoid valves 38 such that the mark 20 having the determined (selected) encoding is sprayed onto the product 10. In particular, the product-marking system 100 is configured to apply a first mark 20 that indicates, for example, the shape of the product 10 at a first position, and to apply a second mark that indicates, for example, the color of the product 10 at a position different than the first mark 20. For this purpose, after the application of the first mark 20, the product 10 is preferably moved to a new position (e.g., from position 1 to position 2 in FIG. 1). Alternatively thereto it is understood that, for example, the spray nozzle 34 can be moved while the product 10 remains stationary.

In the present embodiment, the luminescent materials in the containers 36 are preferably each dissolved or suspended in a solvent, such as water. The solutions and/or suspensions containing the luminescent materials are sprayed onto the products 10 via the spray nozzle 34. The different materials or substances (hereinafter also referred to as "markers" or "taggants") are preferably sprayed-on sequentially. If the markers, which are typically formed as microparticles, are dispersed in a suspension, the suspension liquid may be flushed by circulation in order to maintain the markers uniformly distributed (dispersed) in the suspension so that they do not settle (sediment) out. Such systems are known to persons skilled in the art, so a description thereof is omitted here.

To check whether the mark(s) has (have) been correctly applied, a test device 42 can be provided that is configured to check whether the determined (selected) encoding is present or not. An example of such a test device 42 is shown, for example, in FIG. 4 and can be constructed similar to a corresponding device of a below-described product-identification system 200 for identifying the product 10.

After completion of the mark-application process described above, a surface of the product 10 is printed with one or more marks 20 that indicate(s) one or more properties of the product 10 (for example, shape and color) and can be read (detected, recognized) in an automated manner (e.g., by a mark reader, such as the product-identification system 200 described below) at a later time in the manner described below.

Figure 2:
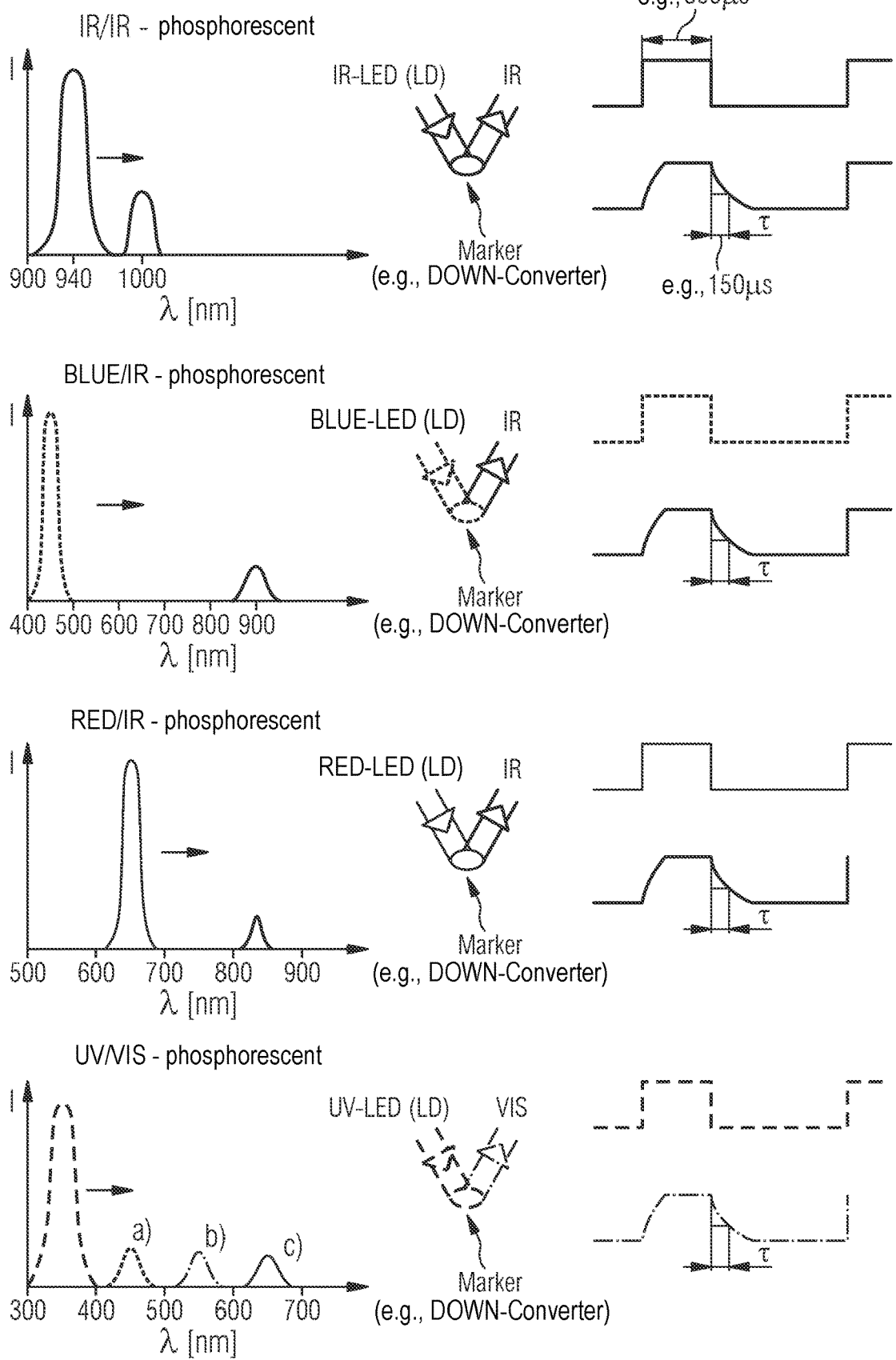
FIG. 2 shows an illustration of the properties of different luminescent materials having differing characteristic decay behaviors.

FIG. 2 shows various luminescent markers that have differing predetermined decay behavior (e.g., different decay times) and can be used in connection with the product-marking system 100 of the present teachings. In the context of the present teachings, the term "luminescence" is intended to encompass both the phenomenon of phosphorescence, shown in FIG. 2, that decays with a certain time constant, and a fluorescence without such a phosphorescence, which is described in the following with reference to FIG. 3.

As shown in FIG. 2, some known luminescent markers can be excited in the infrared (IR) range and also luminesce in the IR range, but at a longer wavelength than the excitation wavelength (cf. the left illustration in the first row of FIG. 2). As shown in the right illustration in the first row of FIG. 2, the excitation occurs, for example, using an excitation pulse of, for example, 300 µs, and results in a luminescence having a time constant $\tau$ of a decay behavior (generally the time until the drop to 1/e of the initial intensity) of, for example, 150 µs. The present example uses a so-called "DOWN converter" or "down shifter", in which the emitted wavelength is longer than the excitation wavelength.

Row 2 of FIG. 2 shows a marker that is excited in the blue wavelength range and also luminesces in the IR range. Such a marker is also known as a "DOWN converter" or "down shifter" that emits light in the IR range after excitation using, for example, a blue LED, again with a predetermined decay behavior or a corresponding time constant $\tau$ thereof.

As shown in row 3 of FIG. 2, the known marker is excited in the red wavelength range and luminesces in the IR range. In this case as well, a predetermined time constant $\tau$ can be attributed to the decay behavior.

Finally, the last row in FIG. 2 shows that markers that are excited in the UV range also can be used and, depending on the marker used, that phosphoresce in the visible range (VIS). Depending on the marker used, emissions occur in different wavelength ranges a), b) and c) with respectively different decay behaviors.

Figure 3:
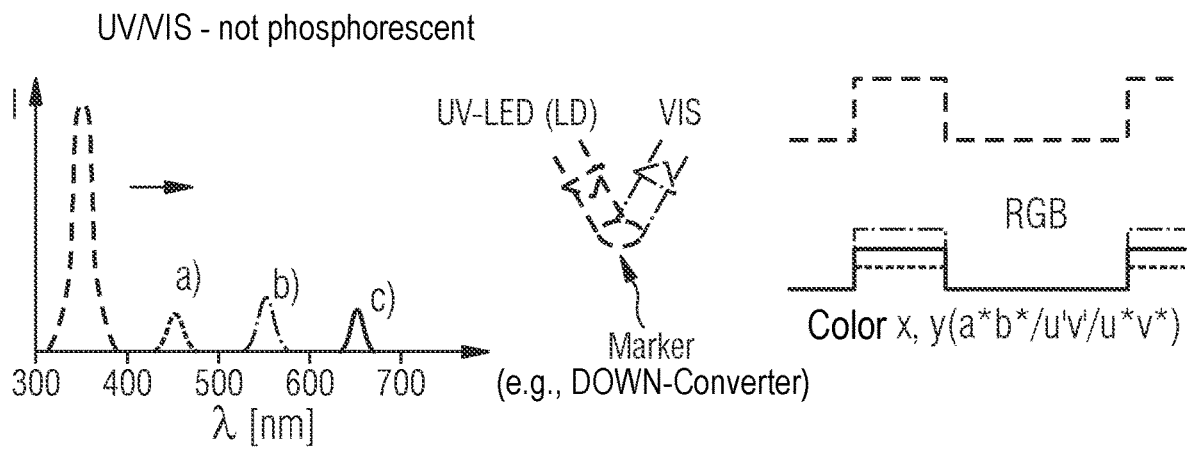
FIG. 3 shows an illustration of the properties of different fluorescing materials.

FIG. 3 shows that one or more markers that do not phosphoresce but rather fluoresce also can be used in some aspects of the present teachings. Fluoresce means that, upon being excited, for example, in the UV range, fluorescent materials immediately emit light in the visible range VIS and the fluorescence immediately ends (or within a few nanoseconds) of the termination of the excitation. For such materials, the color (wavelength) of the emitted light again depends on the type of the marker used (see the peaks a), b) and c) in the left part of FIG. 3). As described below, the color of the emitted light can be determined (detected, recognized) by a suitable color detector (for example, a fluorescence color sensor sold by the present applicant), and the presence of the markers a), b) and c) can be inferred based the output of the color detector.

In some embodiments of the present teachings, at least one marker, or preferably a plurality of markers, having a luminescent decay behavior is (are) used to form the encoding(s) (luminescent marker(s)). There is no upper limit on the total number of the possible markers that may be utilized to form the encoding(s), but the upper limit is based, in practice, on the availability of markers having appropriate luminescences.

FIG. 5 shows a table of various, currently known markers that can be used in connection with the present teachings. Here, commercially available markers can be used, such as, for example, activated zinc sulfides, modified yttrium oxysulfides (which are optionally doped with europium), garnet, rare-earth gallates/germanates, modified rare-earth oxysulfides, modified gadolinium oxysulfides, chromium-containing gallates, etc.

As shown in FIG. 5, there are, for example, three markers that are excitable in the UV range and each luminesce in the visible range with different decay behaviors. In connection with a use of, for example, two combinations, each having two of the markers, as well as the case that none of the markers is present, three further values can be encoded that indicate the presence or absence of the respective luminescent markers. Thus, by using luminescent markers that are excitable in the UV range while luminescing in the visible range, six values (e.g., 1 to 6) can be encoded. These could, for example, constitute the three first bits or three last bits of a binary encoding.

Furthermore, as shown in FIG. 5, three markers are also known that do not phosphoresce but rather fluoresce in the visible range when excited in the UV range (second column in FIG. 5). Two combinations, for example, of the different markers can also be used here, in order to obtain a total of five possible colors of fluorescence. In combination with an encoding the represents (specifies) the absence of all of the three markers, six different values can again be encoded.

In addition, two known markers luminesce in the IR range when excited in the blue wavelength range (column 3 in FIG. 5), so that four further values can be encoded similar to the above-described manner.

Column 4 in FIG. 5 shows that a marker can also be used that can be excited in the red wavelength range and luminesces in the infrared range, which also results in two values.

Finally the last column in FIG. 5 shows that, in an analogous manner, three different markers can be used that are excitable in the infrared range and also luminescence in the infrared range, which again leads to six possible values for a binary encoding.

From FIG. 5 it can also be seen that, in total, 6×6×4×2×6=1728 encodings can be obtained by using the different markers shown in FIG. 5. The number and type of markers that are used can differ in accordance with the application of the present teachings. For example, the plurality of materials can include at least two markers, each having different decay behavior (e.g., decay times), and the presence or absence of such markers forms part of the encoding. In particular, the at least two markers can have at least two different excitation wavelength ranges that are selected from the group consisting of UV, blue, red, and IR. For example, it is possible to use the marker that is excitable in the red wavelength range and one of the markers that is excitable in the UV wavelength range in one embodiment of the present teachings.

Alternatively or additionally, at least two markers can be used that are excited in the same wavelength range and differ with respect to the time constant of the decay behavior and/or the emitted wavelengths. These can be, for example, two of the markers that are excitable in the UV wavelength range.

In the above-mentioned case, a decay behavior that is detected when the two markers are present is different from the decay behavior of the individual markers, and the encoding specifies whether both markers are present or not. This corresponds, for example, to the combination 4 in the first column of FIG. 5.

In addition, the plurality of materials can include at least one non-phosphorescing marker whose emission wavelength falls, for example, in the visible range (at least one of the markers shown in column 2 of FIG. 5). Preferably at least two non-phosphorescing markers having the same excitation wavelength range, for example in the UV range, and having different emission wavelengths, for example in the visible range, are used, based on which it can be determined whether none, one, or both of the non-phosphorescing markers is (are) present. Thus, for example, by using the markers in column 2 of FIG. 5, which fluoresce in the green wavelength range and in the red wavelength range, it can be determined, based on the color of the fluorescence (green, red, or yellow), whether one of the two markers, none of the two markers, or both markers is (are) present in the detected encoding.

Figure 4:
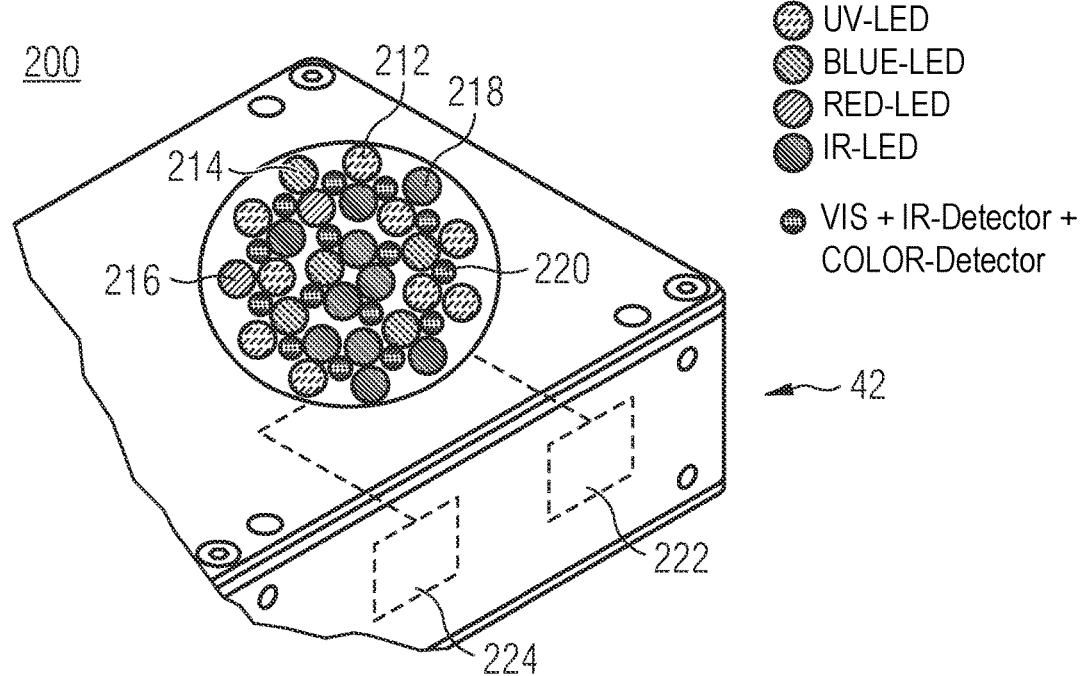
FIG. 4 shows a partial perspective view of a representative product-identification system according to the present teachings.

FIG. 4 shows a partial perspective view of a representative product-identification system 200 for identifying the product 10 according to the present teachings. The product-identification system 200 includes a plurality of light-emitting units (for example, LEDs) 212, 214, 216, 218 that are respectively configured to emit light in different wavelength ranges (for example, UV, blue, red, and IR) toward a surface of the product 10 to be identified. Furthermore, a control unit 224 is configured to control the ON/OFF states of the plurality of light-emitting units such that they respectively emit light at appropriate timings. A detection unit 220 is configured to detect respective intensities of light emitted from the surface of the product 10 in response to excitation light emitted from the respective light-emitting units 212, 214, 216, 218. Furthermore, an evaluation unit 222 is configured to determine (identify, recognize), based on the intensities detected by the detection unit 220 (as well as the temporal course thereof), an encoding (in particular, based on one or more time constants of the respective decay behaviors) that is associated with a property of the product 10. The encoding is structured as described above and specifies the presence or absence of each of a plurality of luminescent materials (markers), wherein at least one of the luminescent materials (markers) has a predetermined decay behavior that is utilized to make the determination (identification, recognition) of the encoding. As was already mentioned above, in the context of the present specification, the term "luminescence" is intended to mean that either a secondary emission having a predetermined decay behavior is present, or that a fluorescence without phosphorescence is present. As shown in FIG. 4, the light-emitting units, the control unit, the detection unit, and the evaluation unit can be integrated (housed, accommodated), for example, in a corresponding housing. However, it is understood that in other embodiments, for example, only the light-emitting units can be integrated in an optionally portable device, while one or more of the control unit 224, the detection unit 220, and the evaluation unit 222, can be provided separately.

An exemplary method for detecting the encoding can be effected such that the UV LEDs of the device 42 first emit a light pulse having a predetermined duration, and the time constant of the decay behavior of the luminescence is subsequently determined (detected). Depending on whether one of the markers shown in column 1 in FIG. 5 is present, none is present, or a combination of the markers in column 1 in FIG. 5 is present, different decay behaviors are detected. Accordingly, the first six values of the encoding can be determined. Subsequent thereto (or simultaneously when suitable detectors are used), the UV-LED can emit a (further) light pulse, based on which the color of a fluorescence owing to the presence of one or more of the markers in column 2 in FIG. 5 can be detected. Based on the detected emission wavelengths, the second six values of the encoding can be determined accordingly.

In a similar manner, the blue LEDs, the red LEDs, and the IR LEDs can emit corresponding light pulses, and corresponding decay behaviors or time constants are detected in order to determine the remaining values of the encoding. Based on the determined values or a bit sequence derived therefrom, an unambiguous association of the encoding with the property of the product 10 can then take place. As also mentioned, it is possible to establish this association in advance and store the associations in a database for use by the product-identification system 200.

Using the above-described product-marking system and/or the above-described luminescent markers, a method for marking a product 10 can be carried out that includes the following steps: detecting at least one property of the to-be-marked product 10, determining (selecting) an encoding to be associated with the property, and applying a plurality of luminescent materials onto the product 10 so that a mark 20 that corresponds to the determined encoding is applied.

Even though the above embodiment has been described for the case that the product 10 is a workpiece in the context of a manufacturing process, for example, a leather cutting, it is understood that the present teachings also can be applied to various other applications. Thus, other products (e.g., articles of manufacture) can also be provided with the luminescent marks according to the present teachings, such as, for example, tires, e.g., automobile tires, wherein in this case the property can be one or more of, for example, a tire profile depth, the manufacturer, the size, etc. This can be advantageous, for example, in the context of warehousing of the product. That is, owing to the fact that the mark is not visible with the naked eye, a security against manipulations and the like can be ensured.

In a further application of the luminescent marks (markers) according to the present teachings, a plastic material, such as for example, for a packaging, in particular for beverages, may have the luminescent marks (markers), e.g., embedded therein. In such an embodiment of the present teachings, the individual luminescent materials or particles, e.g., taggants, can be introduced into the plastic material (masterbatch) during manufacturing, so that when the plastic material is later used, for example, as a plastic layer of the packaging, a corresponding mark can be provided in an automated manner. The product-identification system 100 described above could also be used for detecting the luminescent markers. For example, the control unit 24 could be configured to receive or retrieve (detect) information with respect to the product to be to be marked, for example, a plastic tab or the like for the pharmaceutical industry. Then, based on this information, the encoding device 16 can be configured to determine the encoding to be used in the plastic material. In this case, the mark-application unit 18 can include a plurality of metering devices that are driven by the control device 24 in accordance with the encoding such that a respective masterbatch that contains a marker of the encoding is added to the plastic product stream that is subsequently supplied, for example, to an extrusion system. In this way, the intended encoding reaches the plastic matrix of the product. It is understood that masterbatches that contain more than one marker can also be used. For example, a masterbatch for each encoding that already includes all of the associated markers may be used. Furthermore, compositions constituted as a prefabricated mixture, which is made of plastic granules (without admixtures) and a masterbatch (with color pigments and/or one or more markers or taggants), can also be used and can be added in accordance with the determined encoding.

Based thereon, for example, in the context of a recycling, different plastic bottles can be reliably and dependably differentiated and separated (e.g., sorted) accordingly. For example, different plastic bottles made of the same base material can be separated depending on their use (for example, in the foodstuffs sector or in the sanitation sector) during the recycling process, even if they are essentially comprised of the same material. The plastic bottles can also be separated or sorted based on the encoding described herein by detecting at least one predetermined decay behavior or preferably a plurality of different decay behaviors.

It is explicitly emphasized that all of the features disclosed in the description and/or the claims should be considered as separate and independent from one another for the purpose of the original disclosure as well as for the purpose of limiting the claimed invention, independent of the combinations of features in the embodiments and/or the claims. It is explicitly stated that all range specifications or specifications of groups of units disclose every possible intermediate value or subgroup of units for the purpose of the original disclosure as well as for the purpose of limiting the claimed invention, in particular also as the limit of a range specification.

Additional embodiments of the present teachings include but are not limited to:

1. A product-marking system (100) for marking a product (10), including
    a product-identification device (12) configured to detect at least one property of the product (10) to be to marked,
    an encoding device (16) configured to determine an encoding to be associated with the property, wherein the encoding specifies the presence or absence of each of a plurality of materials that exhibit a luminescence, and of which at least one exhibits a predetermined decay behavior,
    a mark-application unit (18) configured to apply the plurality of materials onto the product (10), and
    a control unit (24) configured to control the mark-application unit (18) such that it applies a mark (20), which corresponds to the determined encoding, onto the product (10).

2. The product-marking system according to the above embodiment 1, wherein the plurality of materials includes at least two markers respectively having different decay behaviors, the presence or absence of which markers forms part of the encoding.

3. The product-marking system according to the above embodiment 2, wherein the at least two markers have at least two different excitation wavelength ranges that are selected from the group consisting of UV, blue, red, and IR.

4. The product-marking system according to one of the above embodiments 2 or 3, wherein the at least two markers are excited in the same wavelength range, and differ with respect to the time constant of their decay behavior and/or the emitted wavelength.

5. The product-marking system according to the above embodiment 4, wherein when the two markers are present, a decay behavior that is detected is different from the decay behavior of the individual markers, and the encoding specifies whether or not both markers are present.

6. The product-marking system according to one of the above embodiments 1 to 5, wherein the plurality of materials includes at least one non-phosphorescing marker whose emission wavelength falls in the visible range.

7. The product-marking system according to the above embodiment 6, wherein at least two non-phosphorescing markers having the same excitation wavelength range, for example in the UV range, and having different emission wavelengths, for example in the visible range, are used, based on which it can be determined whether none, one, or both of the non-phosphorescing markers is or are present.

8. The product-marking system according to one of the above embodiments 1 to 7, wherein the product detection device (12) is an optical product detection device that includes at least one camera (26) or at least one color detection sensor (28).

9. The product-marking system according to the above embodiment 8, wherein the property is a shape of the product (10) determined by the camera (26), or a color of the product determined by the color detection sensor (28).

10. The product-marking system according to one of the above embodiments 1 to 9, which is configured to apply a further mark, which indicates a further property of the product (10), onto the product at a position different than the mark (20).

11. The product-marking system according to one of the above embodiments 1 to 10, wherein the mark-application unit (18) includes a spray nozzle (34) and a plurality of containers (36), in which the plurality of materials is respectively contained, and which are each connected to the spray nozzle via a solenoid valve (38), wherein the control unit (24) is configured to control the respective solenoid valves (38) such that the mark (20) having the determined encoding is sprayed onto the product (10).

12. The product-marking system according to the above embodiment 11, wherein the materials are dissolved in a solvent, for example, water, contained in the containers (36), and are sprayed-on using the spray nozzle (34).

13. The product-marking system according to one of the above embodiments 1 to 12, further including a test device (42) that is adapted to check whether the applied mark (20) includes the determined encoding.

The product-marking system according to one of the above embodiments 1 to 13, wherein the product (10) is a leather cutting, on the rear side of which the mark (20) is applied, or a tire, in particular an automobile tire, that is provided with the mark (20).

15. A product-identification system (200) for identifying a product (10), including
a plurality of light-emitting units (212, 214, 216, 218) configured to respectively emit light in different wavelength ranges toward a surface of the product (10) to be identified,
a control unit (224) configured to control the plurality of light-emitting units (212, 214, 216, 218) such that they emit light,
a detection unit (220) configured to detect respective intensities of light emitted from the surface of the product (10) in response to light emitted from the respective light-emitting units (212, 214, 216, 218), and
an evaluation unit (222) configured to determine, based on the intensities detected by the detection unit (220), an encoding that is to be associated with a property of the product (10),
wherein the encoding specifies the presence or absence of each of a plurality of materials that exhibit a luminescence, and of which at least one exhibits a predetermined decay behavior.

16. The product-identification system according to the above embodiment 15, wherein the plurality of materials includes at least two markers respectively having different decay behaviors, wherein the evaluation unit (222) is configured to determine their presence or absence as a part of the encoding. Optionally, the plurality of materials further includes at least one non-phosphorescing (e.g., fluorescent) material having an emission wavelength in the visible range.

17. The product-identification system according to the above embodiment 16, wherein the at least two markers have at least two different excitation wavelength ranges that are selected from the group consisting of UV, blue, red, and IR, and the control unit (224) is adapted to control the plurality of light-emitting units (212, 214, 216, 218) such that they emit light in the at least two different excitation wavelength ranges.

18. A method for marking a product (10), including
detecting at least one property of the product (10) to be to marked,
determining an encoding to be associated with the property, wherein the encoding specifies the presence or absence of each of a plurality of materials that exhibit a luminescence, and of which luminescences at least one exhibits a predetermined decay behavior, and
applying the plurality of materials to the product (10) such that a mark (20) that corresponds to the determined encoding is applied.

19. A plastic material for use in a product (10), including a plurality of materials that exhibit a luminescence, and of which at least one exhibits a predetermined decay behavior, wherein the presence or absence of each of the plurality of materials determines an encoding that is associable with a property of the product (10).

20. The plastic material according to the above embodiment 19, wherein the plurality of materials includes at least two markers respectively exhibiting different decay behaviors, the presence or absence of which markers forms part of the encoding.

21. The plastic material according to the above embodiment 20, wherein the at least two markers have at least two different excitation wavelength ranges that are selected from the group comprised of UV, blue, red, and IR.

22. The plastic material according to one of the above embodiments 20 or 21, wherein the at least two markers are excited in the same wavelength range and differ with respect to the time constant of their decay behavior and/or the emitted wavelength.

23. The plastic material according to one of the above embodiments 19 to 22, wherein the plurality of materials includes at least one non-phosphorescing marker whose emission wavelength falls in the visible range.

24. The plastic material according to the above embodiment 23, wherein at least two non-phosphorescing markers having the same excitation wavelength range, for example in the UV range, and having different emission wavelengths, for example in the visible range, are used, based on which it can be determined whether none, one, or both of the non-phosphorescing markers is or are present.

25. A packaging, in particular for beverages, including a plastic material according to one of the above embodiments 19 to 24.

26. A plastic material for use in marking a product, including:
a synthetic polymer, and
a plurality of luminescent materials contained in the synthetic polymer, wherein:
at least one of the plurality of luminescent materials exhibits a predetermined decay behavior,
at least one of the plurality of luminescent materials is a non-phosphorescing marker having an emission wavelength that falls in the visible range, and
the presence or absence of each of the plurality of luminescent materials determines an encoding that is associable with a property of the product.

27. The plastic material according to the above embodiment 26, wherein the plurality of luminescent materials includes at least two markers respectively exhibiting different decay behaviors, the presence or absence of which markers forms part of the encoding.

28. The plastic material according to the above embodiment 27, wherein the at least two markers respectively have at least two different excitation wavelength ranges that are selected from the group comprised of UV, blue, red, and IR.

29. The plastic material according to the above embodiment 27, wherein the at least two markers are excited in the same wavelength range and exhibit one of different decay times or different emitted wavelengths.

30. The plastic material according to one of the above embodiments 26-29, wherein the plurality of luminescent materials includes at least two non-phosphorescing markers having the same excitation wavelength range and having different emission wavelengths.

31. A packaging, such as a beverage bottle, comprising a plastic material according to one of the above embodiments 26-30.

32. A product-identification system for identifying a product, including:
   a plurality of light-emitting units configured to respectively emit light in different wavelength ranges toward a surface of the product,
   a control unit configured to selectively energize the plurality of light-emitting units to emit light,
   a detection unit configured to detect respective intensities of light emitted from the surface of the product in response to the light emitted from the respective light-emitting units, and
   an evaluation unit that is configured to determine, based on the intensities detected by the detection unit, an encoding that is associated with a property of the product,
   wherein the encoding specifies the presence or absence of each of a plurality of luminescent materials, and
   at least one of the plurality of luminescent materials exhibits a predetermined decay behavior.

33. The product-identification system according to the above embodiment 32, wherein:
   the plurality of luminescent materials includes at least two markers respectively having different decay behaviors, and
   the evaluation unit is configured to determine the presence or absence of the plurality of luminescent materials as a part of the encoding.

34. The product-identification system according to one of the above embodiments 32 or 33, wherein the evaluation unit is configured to determine the presence or absence of the plurality of luminescent materials based on a decay behavior of the plurality of luminescent materials.

35. The product-identification system according to one the above embodiments 33-34, wherein:
   the at least two markers have at least two different excitation wavelength ranges selected from the group consisting of UV, blue, red, and IR, and
   the control unit is configured to energize the plurality of light-emitting units to emit light in the at least two different excitation wavelength ranges.

Depending on design requirements, exemplary embodiments of the encoding device 16, the control unit 24 and/or the evaluation unit 222 of the present disclosure may be implemented in hardware and/or in software. The encoding device 16, the control unit 24 and/or the evaluation unit 222 can be configured using a digital storage medium, for example one or more of a ROM, a PROM, an EPROM, an EEPROM, a flash memory, etc., on which electronically readable control signals (program code—instructions) are stored, which interact or can interact with one or more programmable hardware components to execute programmed functions.

The (each) programmable hardware component can be formed by a processor, a computer processor (CPU=central processing unit), an application-specific integrated circuit (ASIC), an integrated circuit (IC), a computer, a system-on-a-chip (SOC), a programmable logic element, and/or a field programmable gate array (FGPA). A microprocessor is a typical component of a microcontroller according to the present teachings.

The digital storage medium can therefore be machine- or computer-readable. Some exemplary embodiments thus comprise a data carrier or non-transient computer readable medium which includes electronically readable control signals which are capable of interacting with a programmable computer system or a programmable hardware component such that one of the methods or functions described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the encoding device 16, the control unit 24 and/or the evaluation unit 222, are implemented as a program, firmware, computer program, or computer program product including a program, or as data, wherein the program code or the data is operative to perform one of the methods when the program runs on (is executed by) a processor or a programmable hardware component. The program code or the data can for example also be stored on a machine-readable carrier or data carrier, such as any of the types of digital storage media described above. The program code or the data can be, among other things, source code, machine code, bytecode or another intermediate code.

A program according to an exemplary embodiment can implement one of the methods or function during its performance, for example, such that the program reads storage locations and/or writes one or more data elements into these storage locations, wherein switching operations or other operations are induced in transistor structures, in amplifier structures, or in other electrical, electronic, optical, magnetic components, or components based on another functional or physical principle. Correspondingly, data, values, sensor values, or other program information can be captured, determined, or measured by reading a storage location. By reading one or more storage locations, a program can therefore capture, determine or measure sizes, values, variables, and other information, as well as cause, induce, or perform an action by writing in one or more storage locations, as well as control other apparatuses, machines, and components, and thus for example also perform any complex process that the control unit 24 and/or the evaluation unit 222 according to the present teachings may be designed to perform.

Although some aspects of the present teachings have been described in the context of a device or apparatus, it is to be understood that these aspects also represent a description of a corresponding method, so that a block or a component of a device or apparatus is also understood as a corresponding method step or as a feature of a method step. In an analogous manner, aspects which have been described in the context of or as a method step also represent a description of a corresponding block or detail or feature of a corresponding device.

We claim:
1. A product-marking system for marking a product, including:
   a product-identification device configured to detect at least one physical property of the product,
   an encoding device configured to determine an encoding based on the detected physical property, a mark-application unit configured to apply a plurality of luminescent materials onto the product to form a mark, and
a control unit configured to control the mark-application unit to apply the mark onto the product,
wherein:
the mark corresponds to the encoding determined by the encoding device,
the encoding specifies a presence or absence of each of the plurality of luminescent materials, and
at least one of the plurality of luminescent materials exhibits a predetermined decay behavior.

2. The product-marking system according to claim 1, wherein:
the plurality of luminescent materials includes at least two markers respectively having different decay behaviors, and
the encoding is formed, in part, by the presence or absence of the at least two markers.

3. The product-marking system according to claim 2, wherein the at least two markers respectively have at least two different excitation wavelength ranges selected from the group consisting of UV, blue, red, and IR.

4. The product-marking system according to claim 3, wherein the at least two markers are excited in the same wavelength range, and differ with respect to the time constant of their decay behavior and/or the emitted wavelength.

5. The product-marking system according to claim 4, wherein the at least two markers exhibit the property that, when the two markers are present in the encoding, the encoding exhibits a detected decay behavior is different from the decay behavior of the each of the two markers individually, and the encoding specifies whether or not both of the at least two markers are present.

6. The product-marking system according to claim 4, wherein the plurality of luminescent materials includes at least one non-phosphorescing marker having an emission wavelength that falls in the visible range.

7. The product-marking system according to claim 6, wherein:
the plurality of luminescent materials includes at least two non-phosphorescing markers having the same excitation wavelength range and having different emission wavelengths,
the excitation wavelength range of the at least two non-phosphorescing markers is in the UV range, and
the emission wavelengths of the at least two non-phosphorescing markers are in the visible range.

8. The product-marking system according to claim 7, wherein:
the product-identification device is configured to detect at least two physical properties of the product,
the product detection device comprises an optical product detection device that includes at least one camera and at least one color detection sensor,
the encoding device is configured to select the encoding based on each of the detected physical properties from a plurality of encodings,
the mark-application unit is configured to apply the plurality of luminescent materials onto the product to form a plurality of different marks that respectively correspond to the plurality of encodings, and
the control unit is configured to:
determine a shape of the product based on data output by the camera,
determine a color of the product based on data output by the color detection sensor, and
control the mark-application unit to apply the marks onto the product in accordance with the mark(s) determined by the encoding device.

9. The product-marking system according to claim 8, wherein:
the mark-application unit includes a spray nozzle and a plurality of containers respectively connected to the spray nozzle via a plurality of solenoid valves,
wherein:
the luminescent materials are respectively disposed in the plurality of containers,
the luminescent materials are each dissolved in a solvent, and
the control unit is configured to control the plurality of solenoid valves such that luminescent materials are sprayed onto the product to form the mark having the determined encoding.

10. The product-marking system according to claim 1, wherein the plurality of luminescent materials includes at least one non-phosphorescing marker having an emission wavelength that falls in the visible range.

11. The product-marking system according to claim 10, wherein the plurality of luminescent materials includes at least two non-phosphorescing markers having the same excitation wavelength range and having different emission wavelengths.

12. The product-marking system according to claim 1, wherein:
the product-identification device comprises an optical product detection device that includes at least one camera or at least one color detection sensor configured to detect the physical property and to supply the detected physical property to the encoding device, and
the encoding device is configured to select an encoding that corresponds to the detected physical property.

13. The product-marking system according to claim 1, wherein:
the product-identification device is configured to detect at least two physical properties of the product,
the encoding device is configured to determine the encoding based on each of the detected physical properties,
the mark-application unit is configured to apply the plurality of luminescent materials onto the product to form a plurality of different marks, and
the control unit is configured to control the mark-application unit to apply the marks onto the product in accordance with the mark(s) determined by the encoding device.

14. The product-marking system according to claim 1, wherein:
the mark-application unit includes a spray nozzle and a plurality of containers respectively connected to the spray nozzle via a plurality of solenoid valves,
wherein:
the luminescent materials are respectively disposed in the plurality of containers, and
the control unit is configured to control the plurality of solenoid valves such that the mark having the determined encoding is sprayed onto the product.

15. The product-marking system according to claim 14, wherein the luminescent materials are each dissolved in a solvent and are sprayed-on using the spray nozzle.

16. The product-marking system according to claim 1, further including a test device configured to check whether the mark, after application to the product, includes the determined encoding.

17. The product-marking system according to claim 1, wherein:
- the product-identification device comprises an optical product detection device that includes at least one camera or at least one color detection sensor;
- the encoding device is configured to select the encoding that corresponds to the detected physical property from a plurality of stored encodings,
- the mark-application unit is configured to apply the plurality of luminescent materials onto the product to form a plurality of marks that each differ from each other,
- the control unit is configured to control the mark-application unit to apply onto the product one mark selected from the plurality of marks based on the encoding selected by the encoding device,
- the plurality of marks respectively correspond to the plurality of stored encodings, and
- each of the plurality of stored encodings uniquely specifies a presence or absence of each of the plurality of luminescent materials.

18. The product-marking system according to claim 1, wherein the encoding device is configured to determine the encoding by:
- (i) selecting the encoding from a plurality of encodings stored in a database of the product-marking system and corresponding to the detected physical property, at least one of the plurality of stored encodings containing at least two of the luminescent materials, or
- (ii) generating the encoding in real time using an algorithm stored in the database and corresponding to the detected physical property, the algorithm being configured to generate at least one encoding that contains at least two of the luminescent materials.

19. The product-marking system according to claim 1, wherein:
- the encoding is one of a plurality of unique encodings, and
- at least one of the plurality of unique encodings contains at least two of the plurality of luminescent materials.

20. A product-marking system for marking a product, including:
- a product-identification device configured to detect at least one property of the product,
- an encoding device configured to determine an encoding to be associated with the property,
- a mark-application unit configured to apply a plurality of luminescent materials onto the product to form a mark, and
- a control unit configured to control the mark-application unit to apply the mark onto the product, wherein:
- the mark corresponds to the encoding determined by the encoding device,
- the encoding specifies a presence or absence of each of the plurality of luminescent materials,
- at least one of the plurality of luminescent materials exhibits a predetermined decay behavior,
- the product-identification device comprises an optical product detection device that includes at least one camera or at least one color detection sensor, and
- the property is a shape of the product determined by the camera or a color of the product determined by the color detection sensor.

21. A method, including:
- detecting at least one physical property of a product to be marked,
- determining an encoding based on the detected physical property, wherein the encoding specifies the presence or absence of each of a plurality of luminescent materials, and at least one of the plurality of luminescent materials exhibits a predetermined decay behavior, and
- applying the plurality of luminescent materials to the product to form a mark that corresponds to the determined encoding.

22. The method according to claim 21, wherein the product is a leather cutting or a tire.

* * * * *